United States Patent [19]

Horiguchi

[11] Patent Number: 5,218,255
[45] Date of Patent: Jun. 8, 1993

[54] ELECTRIC WIPER MOTOR WITH AUTOSTOP MECHANISM

[75] Inventor: Tadayoshi Horiguchi, Yokohama, Japan

[73] Assignee: Jidosha Denki Kogyo Kabushiki Kaisha, Yokohama, Japan

[21] Appl. No.: 845,616

[22] Filed: Mar. 4, 1992

[30] Foreign Application Priority Data

May 14, 1991 [JP] Japan .............................. 3-033691[U]

[51] Int. Cl.⁵ ...................... H02K 11/00; H02K 5/00; H02K 5/10
[52] U.S. Cl. ............................... 310/71; 310/40 MM; 310/85; 310/89
[58] Field of Search .................. 310/68 R, 71, 83, 85, 310/88, 89, 91, 99, 235, 239, 40 MM, 43

[56] References Cited

U.S. PATENT DOCUMENTS

| | | | |
|---|---|---|---|
| 4,398,135 | 8/1983 | Busch et al. | 310/71 X |
| 4,572,979 | 2/1986 | Haar et al. | 310/68 R |
| 4,614,886 | 9/1986 | Schneider et al. | 310/71 X |
| 4,918,272 | 4/1990 | Nishikawa | 200/501 |
| 5,025,184 | 6/1991 | Sekine et al. | 310/71 |
| 5,063,317 | 11/1991 | Bruhn | 310/71 X |
| 5,066,878 | 11/1991 | Sekine et al. | 310/71 X |

Primary Examiner—Steven L. Stephan
Assistant Examiner—E. To
Attorney, Agent, or Firm—Sughrue, Mion, Zinn, Macpeak & Seas

[57] ABSTRACT

An electric wiper motor, which comprises an armature housed in a motor casing, reduction gears housed in a gear casing coupled with the motor casing, an autostop mechanism for stopping a wiper blade at the predetermined position always, a cover member for covering an aperture of the gear casing, motor terminals having ends attached with brushes, and plural conductive plates disposed to the cover member in one body and forming an internal circuit for supplying an electric current to the armature through the autostop mechanism by connecting between an external circuit and the motor terminal or the autostop mechanism. According to this invention, it is easy to assemble the electric wiper motor with the autostop mechanism, and possible to improve the productivity.

6 Claims, 8 Drawing Sheets

ELECTRIC WIPER MOTOR WITH AUTOSTOP MECHANISM

BACKGROUND OF THE INVENTION

1. Field of the Invention

This invention relates to an electric wiper motor used for wiping a windshield of, for example, an automotive vehicle with a wiper blade and, more particularly to a wiper motor with a built-in autostop mechanism for stopping the wiper blade at the predetermined position.

2. Description of the Prior Art

Heretofore, there has been used an electric wiper motor housed with an autostop mechanism as shown in FIG. 8 and FIG. 9.

In a wiper motor 100 illustrated in the figures, an armature 102 is housed in a motor casing 101, and a gear casing 103 is coupled in an end opening of the motor casing 101 by tightening screws (not shown).

The armature 102 is disposed with a commutator 102b at the middle part of an armature shaft 102a provided thereto, and the commutator 102b is in contact with brushes 105 attached to a holder base 104 secured to the gear casing 103.

The brushes 105 are connected respectively with ends of pigtails 106 formed with fine copper wires, and other ends of pigtails 106 are connected to respective base ends of motor terminals 107 press-fitted through the holder base 104. Tip ends of the motor terminals 107 extend toward the side of the gear casing 103, and are connected with ends of lead wire 109 passing through a grommet 108 fitted to the gear casing 103.

Additionally, the gear casing 103 houses reduction gears 110 as shown in FIG. 9. Namely, a worm 110b forming a part of the reduction gears 110 is provided on the armature shaft 102a, the worm 110b is meshed with a worm wheel 110a forming the other part of the reduction gears 110 and the worm wheel 110a is fixed to an output shaft 111.

The worm wheel 110a is disposed with contact plates 112a and 112b forming a part of an autostop mechanism 112 on its rightside face 110a1 in FIG. 9, the contact plates 112a and 112b are so designed as to be in contact with contactors 112c and 112d forming the other part of the autostop mechanism 112, and the respective contactors 112c and 112d are disposed on a cover plate 114 and connected to terminals 113 on the inner side of the cover plate 114.

Furthermore, the gear casing 103 is formed with an aperture 103b on the rightside in FIG. 9, and the cover plate 114 is secured to the casing 103 over the aperture 103b by tightening the screws 115. The cover plate 114 is attached with a resinous connector socket 116 using rivets 116 using rivets 116a, and connector terminals 117 and 118 housed in the connector socket 116 are connected with the other ends of lead wires 109.

In the wiper motor 100 having the aforementioned structure, by connecting a controller (not shown) to the connector terminals 117, 118 and the terminals of the autostop mechanism 112, and turning on a switch of the controller, an electric current is supplied on the connector terminals 117 and 118 according to the contact between the contact plates 112a, 112b and the contactors 112c, 112d of the autostop mechanism 112, and the electric current flows in the armature 102 from the lead wire 109 on one side to another lead wire 109, through the motor terminal 107, the pigtail 106, the brush 105, the commutator 104, another brush 105, another pigtail 106 and another motor terminal 107, thereby rotating the armature 102.

When the armature 102 rotates, the rotational speed of the armature shaft 102 is reduced by the reduction gears 110 and the power is transmitted to the output shaft 111 through the reduction gears 110, the windshield of the automotive vehicle is wiped by the wiper blade (not shown) connected to the output shaft 111.

However, in the aforementioned conventional wiper motor 100, the motor terminals 107 press-fitted through the holder base 104 are connected with the lead wires 109, the lead wires 109 are connected respectively to the connector terminals 117 and 118 housed in the connector socket 116, and the terminals 113 are connected with the connectors 112c and 112d of the autostop mechanism 112 respectively in the cover plate 114. Therefore, it is necessary to carry out such wiring work, respectively. In addition to above, it is necessary to form a fitting hole of the grommet 108 in the gear casing 103 and time is required for fitting the grommet 108 in the gear casing 103 since the lead wires 109 are stretched out from the gear casing 104 by passing through the grommet 108 fitted in the gear casing 103. Accordingly, there is a problem since it is impossible to reduce the time and impossible to avoid deterioration of the productivity.

SUMMARY OF THE INVENTION

Therefore, this invention is directed to solve the aforementioned problem of the prior art, and it is an object to provide an electric wiper motor with a built-in autostop mechanism which is easy to be assembled and possible to be improved in its productivity.

The construction of the electric wiper motor according to this invention in order to accomplish the above-mentioned object is characterized by comprising an armature housed in a motor casing, reduction gears housed in a gear casing coupled with the motor casing on the side of an end opening of the gear casing, an autostop mechanism having contact plates disposed on the final gear of the reduction gear and contactors to contact or part with the contact plates, a cover member for covering an aperture of the gear casing, motor terminals having ends attached respectively with brushes to be in contact with a commutator of the armature and other ends protruding respectively into the gear casing, a holder base fixed to the end opening of the gear casing and secured with the motor terminals by passing them therethrough, and a plurality of conductive plates disposed to the cover member in one body, provided with connector terminals to be connected with an external circuit at their respective ends and having other ends to be connected with the motor terminals or the contactors of the autostop mechanism, the conductive plates forming an internal circuit for supplying an electric current to the armature through the autostop mechanism.

In the electric wiper motor according to this invention, the plural conductive plates are mounted on the cover member covering the aperture of the gear casing in one body. Each of the conductive plates is provided with a connector terminal to be connected with the external circuit at one end thereof, and has another end to be connected with one of the motor terminals attached with brushes and the contactors of the autostop mechanism. Accordingly, the electric wiper motor according to this invention is so designed as to form the internal circuit for supplying an electric current to the armature through the autostop mechanism merely by covering the aperture of the gear casing with the cover member disposed with the conductive plates. Therefore, the wiring work becomes unnecessary and the time is not required for fitting the grommet in the gear casing as compared with the wiper motor of conventional type using the lead wires and the pigtails.

DESCRIPTION OF THE PREFERRED EMBODIMENT

An embodiment of the electric wiper motor according to this invention will be described below on bases of FIG. 1 to FIG. 7.

Figure 1:
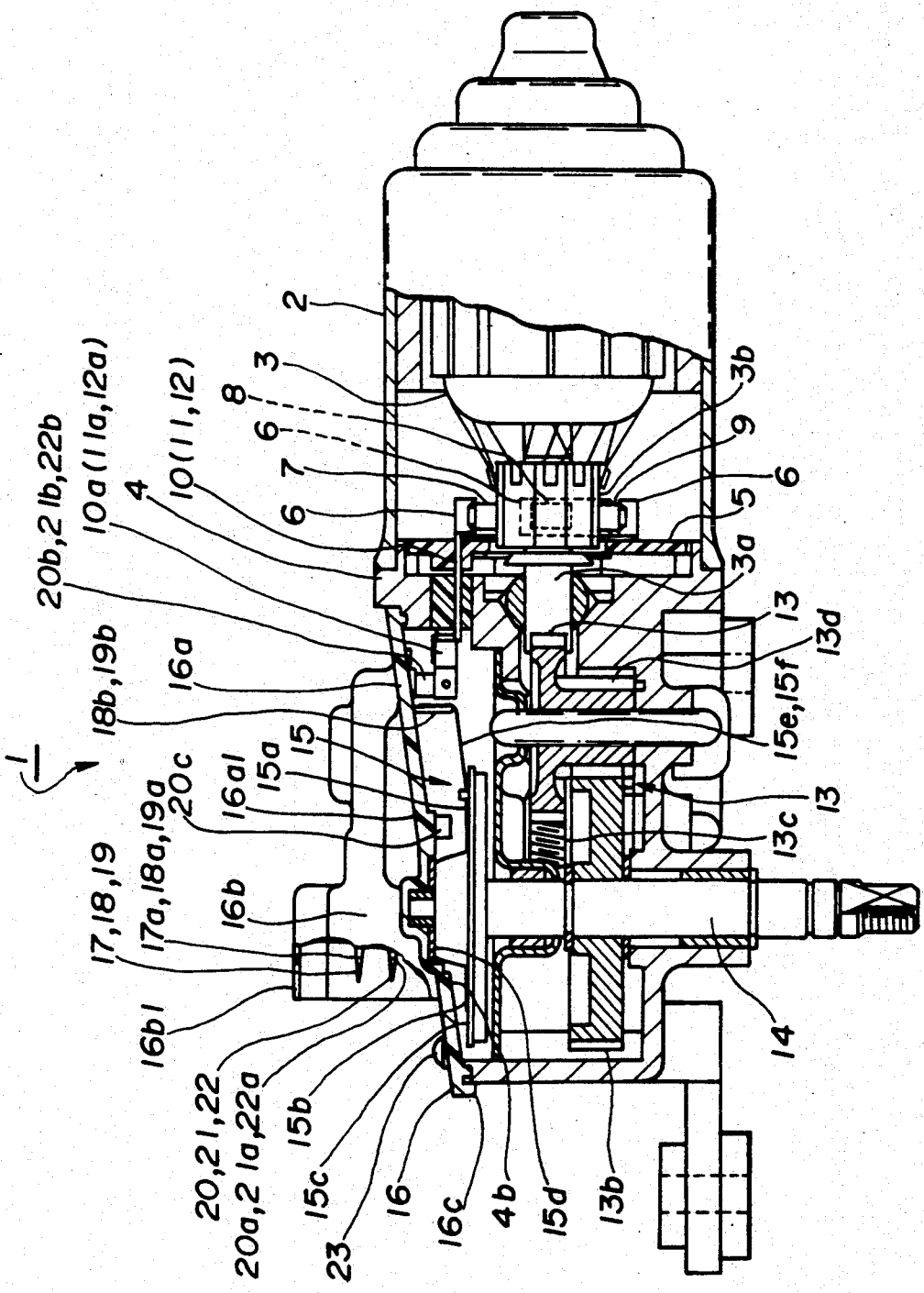
FIG. 1 is a partially sectional front view illustrating an embodiment of an electric wiper motor according to this invention.
Figure 2:
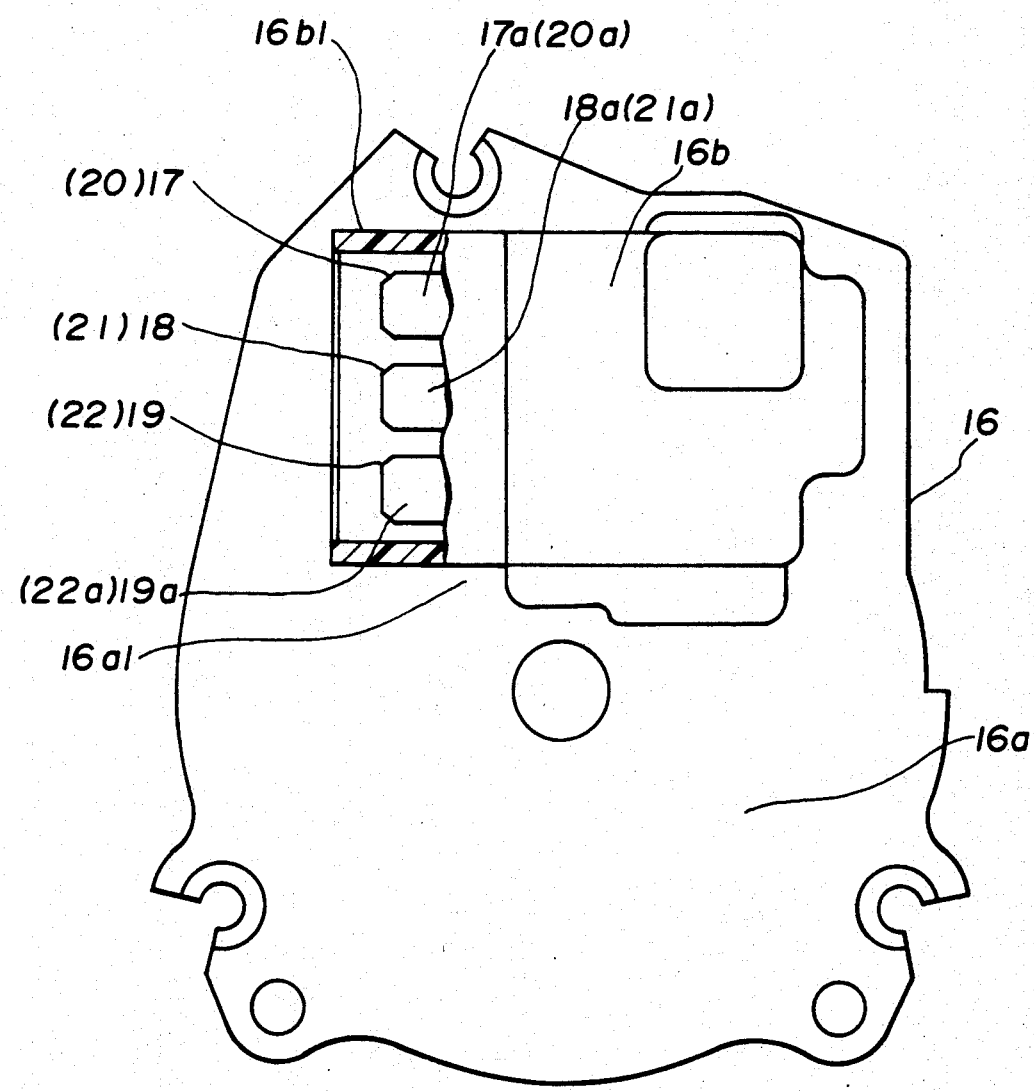
FIG. 2 is a front view showing a cover plate of the electric wiper motor shown in FIG. 1 in detail.

In an electric wiper motor 1 shown in FIG. 1, an armature 3 is housed in a motor casing 2, and an end opening of a gear casing 4 is coupled in an end opening of the motor casing 2 by tightening screws (not shown).

The armature 3 is disposed with a commutator 3b at the middle part of an armature shaft 3a provided thereto, and the commutator 3b is in contact with brushes 7, 8 and 9 secured to a holder base 5 fixed to the end opening of the gear casing 4, through three brush holders 6 and motor terminals 10, 11 and 12.

The holder base 5 is secured with the motor terminals 10, 11 and 12 in a line by passing them therethrough, and the motor terminals 10, 11 and 12 are fixed with the brush holders 6 attached with the brushes 7, 8 and 9 at respective base ends thereof. Furthermore, the other ends of the motor terminals 10, 11 and 12 protrude into the gear casing 4 and are formed respectively into fork-like shaped couplers 10a, 11a and 12a. The couplers 10a, 11a and 12a are so designed as to receive respective ends of conductive plates, which will be described later, and to be connected electrically with the conductive plates.

Additionally, the gear casing 4 houses reduction gears 13, a worm wheel 13a is meshed with a worm 13c provided on the armature shaft 3a, and a final gear 13b of the reduction gears 13, which is meshed with a pinion 13d disposed on the worm wheel 13a in coaxial one body, is secured with an output shaft 14.

Figure 6:
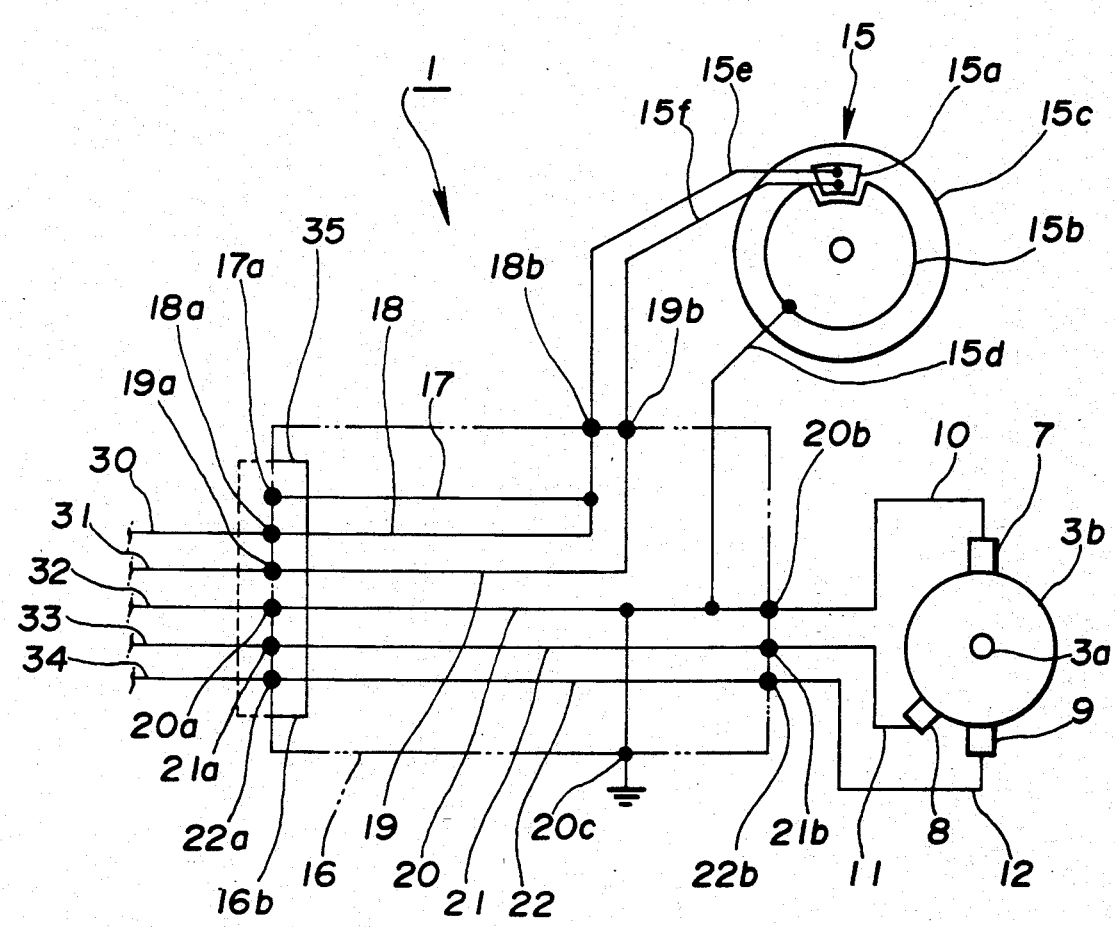
FIG. 6 is a circuit diagram illustrating circuit configuration of an internal circuit of the electric wiper motor shown in FIG. 1.

The output shaft 4 is provided with a plate base 15c at the upper end thereof, which is disposed with a power source side contact plate 15a and a grounded side contact plate 15b forming a part of an autostop mechanism 15 separately with each other, as shown also in FIG. 6. The plate base 15c is so formed as to rotate according to the rotation of the output shaft 14.

The gear casing 4 is formed with an aperture 4b on a slightly inclined upper face thereof as shown in FIG. 1, the aperture 4b is covered with a resinous cover plate 16 (cover member) and the cover plate 16 is fixed to the gear casing 4 by tightening a screw 23 on the side of the aperture 4b.

The cover plate 16 is composed mainly of a base part 16a and a connector socket 16b formed on the upper face 16a1 of the base part 16a as shown in FIGS. 2, 3, 4 and 5, and the cover plate 16 is disposed with conductive plates 17, 18, 19, 20, 21 and 22 in united one body by the insert molding process, which will be described later.

The cover plate 16 is provided with a rim portion 16c to be fitted on the side edge of the aperture 4b of the gear casing 4 on the under face 16a2 at the outer peripheral part of the base part 16a, the aperature 4b is closed by fitting the rim portion 16c onto the side edge of the aperture 4b of the gear casing 4. The cover plate 16 is provided with an earth plate 15d at the nearly center part on the under face 16a2 of the base part 16a for grounding the contact plate 15b disposed on the plate base 15c of the autostop mechanism 15 through the conductive plate 20 and the gear casing 4 in contact with the conductive plate 20 electrically, the plate base 15c of the autostop mechanism 15 is so designed as to rotate together with the output shaft 14 at a state in which the electric contact is maintained between the earth plate 15d and the contact plate 15b of the autostop mechanism 15.

Furthermore, the connector socket 16a provided on the upper face 16a1 of the base part 16a is formed with a joint hole 16b1 for receiveing a connector 35 housed with socket terminals 30, 31, 32, 33 and 34 shown in FIG. 6 and to be connected to an external circuit (not shown), and so structured that six connector terminals 17a, 18a, 19a, 20a, 21a and 22a protrude in the joint hole 16b1, which are ends of the conductive plates 17, 18, 19, 20, 21 and 22, and are connected to the socket terminals 30, 31, 32, 33 and 34.

Figure 7:
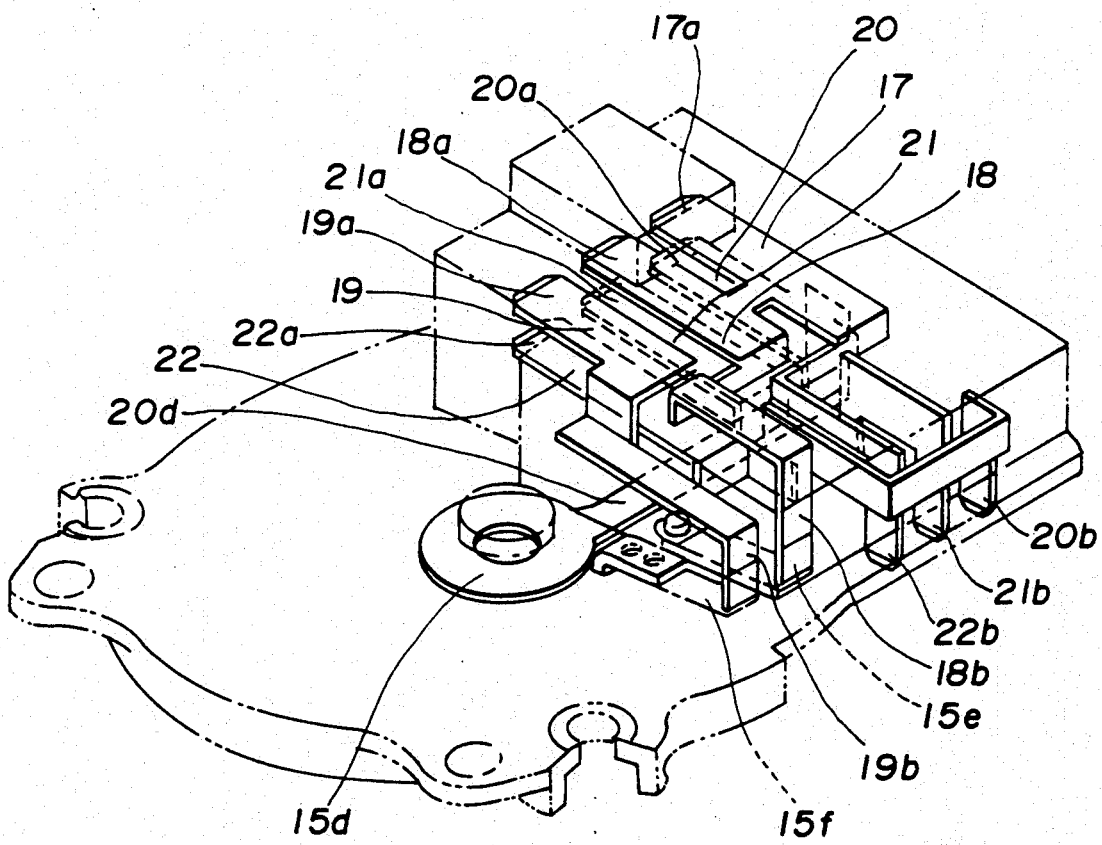
FIG. 7 is perspective view illustrating shapes of the conductive plates mounted on the cover plate shown in FIGS. 2, 3, 4 and 5.
Figure 8:
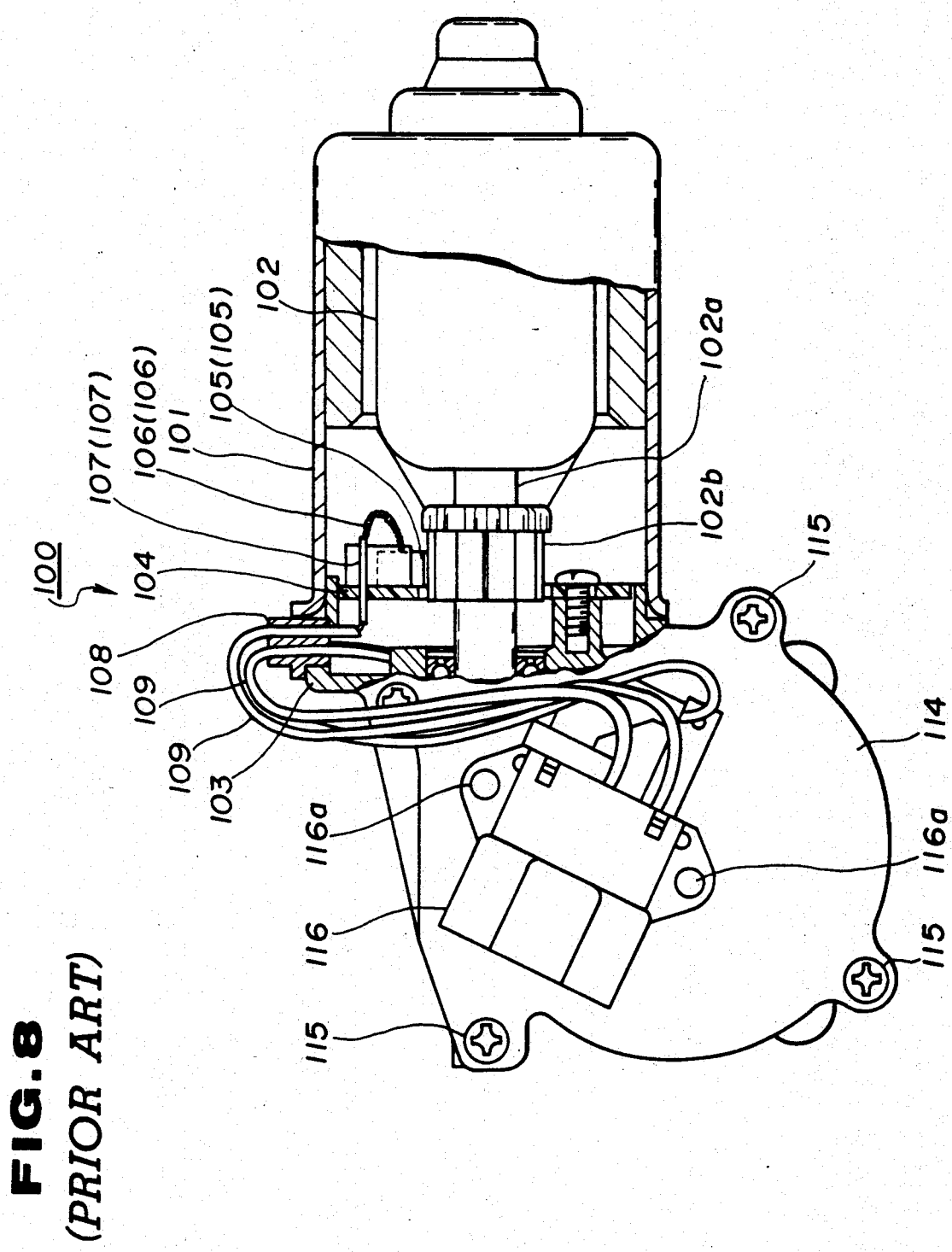
FIG. 8 is a partially sectional front view of a conventional electric wiper motor.
Figure 9:
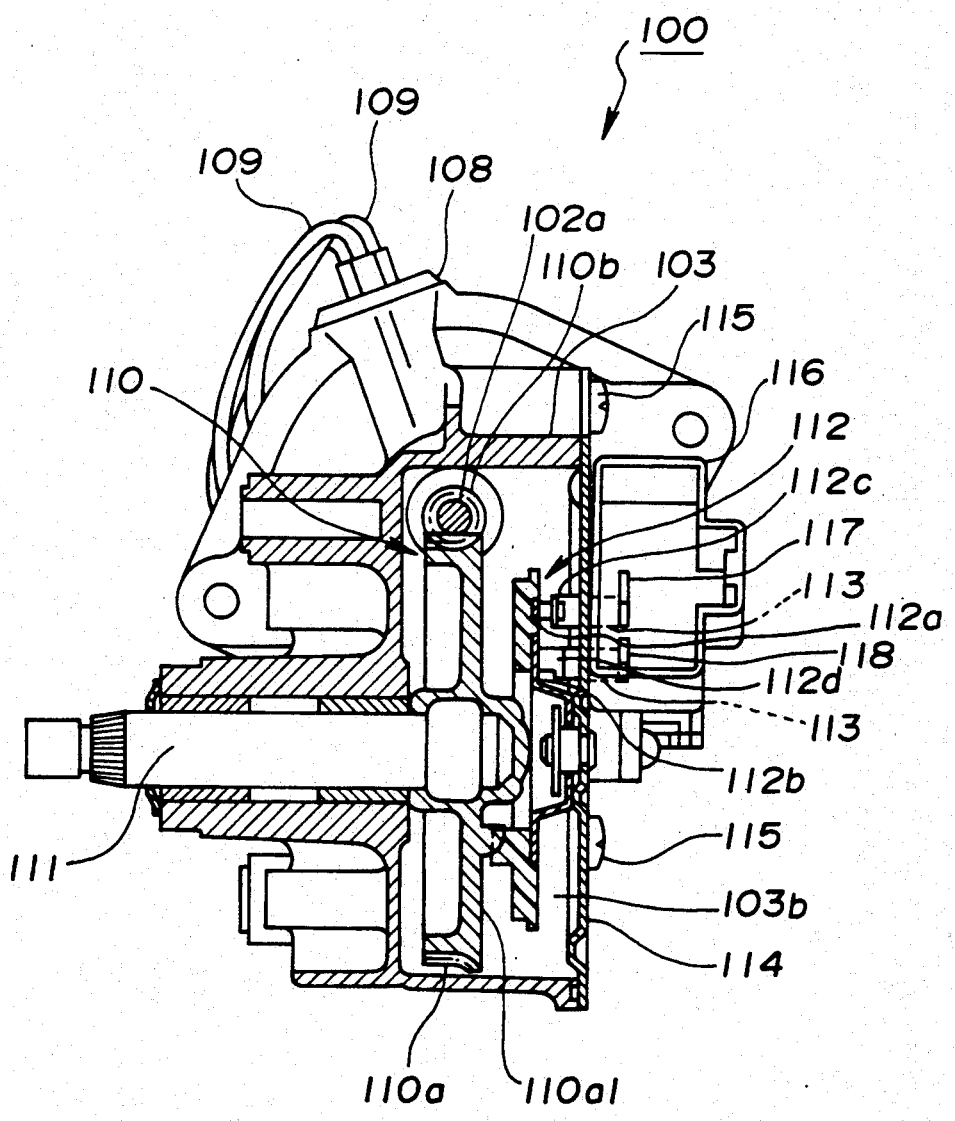
FIG. 9 is a vertical sectional side view of the conventional electric wiper motor shown in FIG. 8.

The conductive plates 17, 18, 19, 20, 21 and 22 are made of materials having electric conductivity such as a copper alloy by press-bending, and disposed on the cover plate 16 in one body as shown in FIG. 7 through the insert molding process so as to form an internal circuit for supplying an electric current to the armature 3 through the autostop mechanism 15 while of covering the aperture 4b of the gear casing 4 with the cover plate 16.

Namely, the first conductive plate 17 is provided with the connector terminal 17a to protrude supplementarily in the joint hole 16b1 of the connector socket 16b at one end thereof, and another end of the first conductive plate 17 is incorporated with the second conductive plate 18 in this embodiment as shown in FIG. 7.

Figure 3:
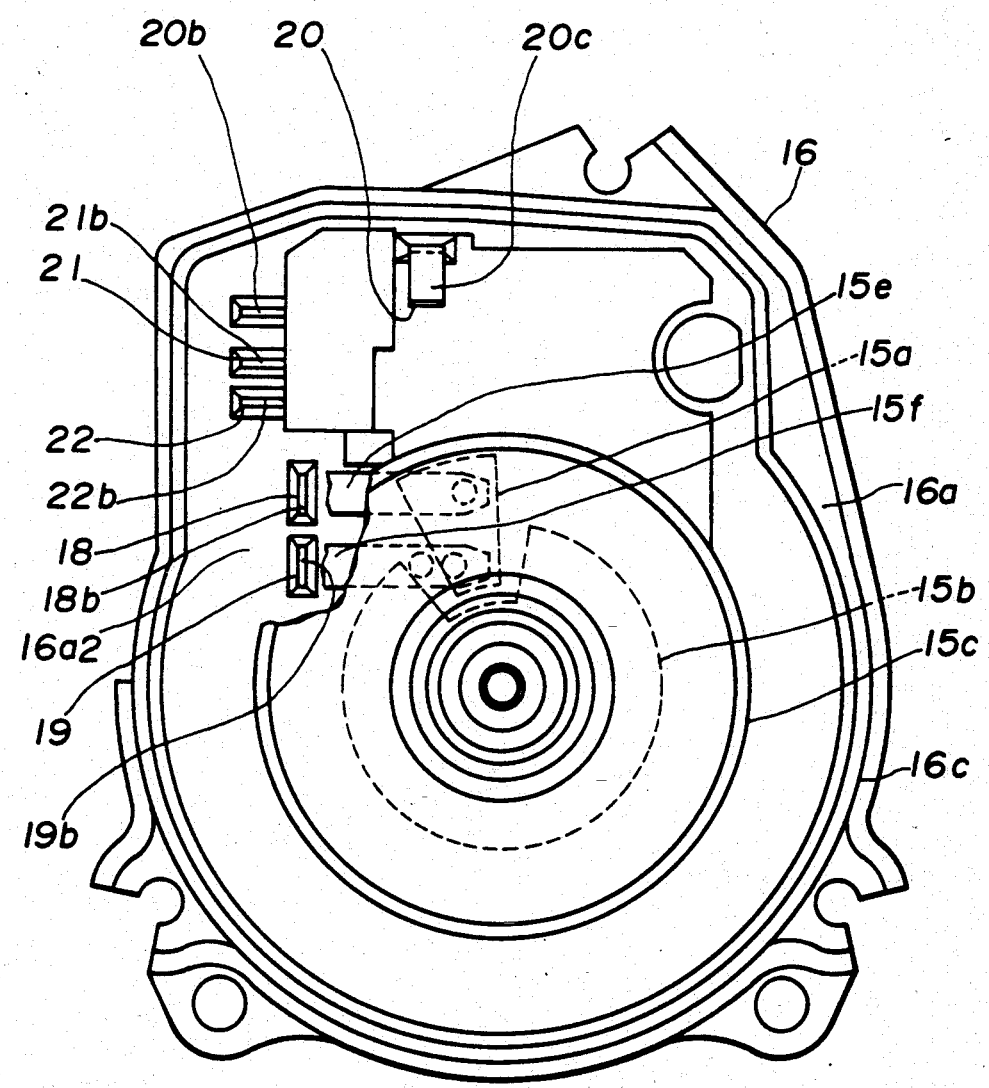
FIG. 3 is a rear elevation of the cover plate shown in FIG. 2 illustrating positional relationship with an autostop mechanism of the electric wiper motor shown in FIG. 1.
Figure 5:
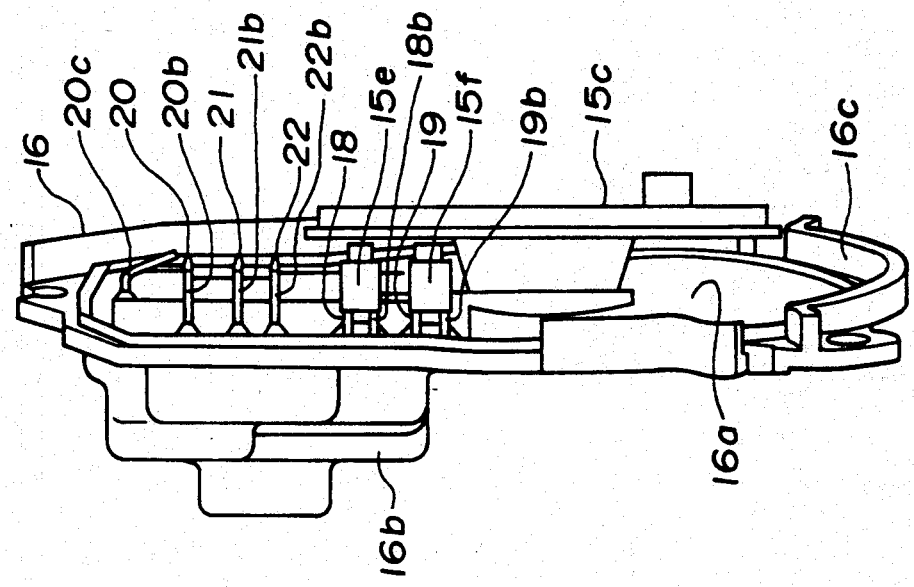
FIG. 5 is a right side elevation of the cover plate shown in FIG. 2.
Figure 4:
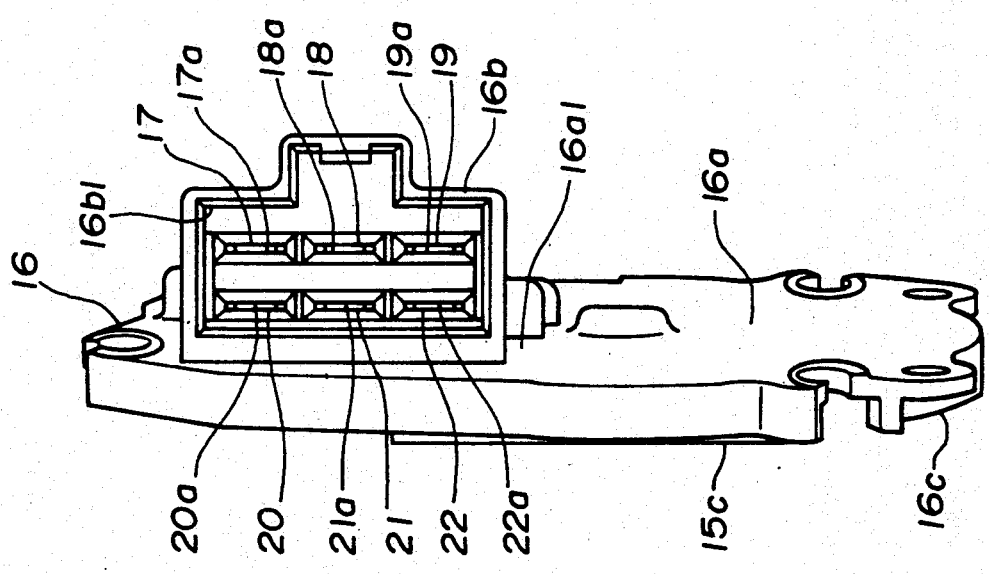
FIG. 4 is a left side elevation of the cover plate shown in FIG. 2.

The second conductive plate 18 is shaped as shown in FIG. 7 and provided with the connector terminal 18a to protrude in the joint hole 16b1 of the connector socket 16b at one end thereof, and another end 18b of the second conductive plate 18 protrudes from the under face 16a2 of the base part 16a as shown in FIGS. 3 and 5, and is connected with a contactor 15e to contact or part with the contact plate 15a of the autostop mechanism 15.

The third conductive plate 19 is shaped as shown in FIG. 7, is provided with the connector terminal 19a to protrude in the joint hole 16b1 at one end thereof, and another end 19b of the third conductive palte 19 protrudes from the under face 16a2 of the base part 16a similarly to the end 18b of the second conductive plate 18 and connected with a contractor 15f to contact or part with the contact plates 15a and 15b of the autostop mechanism 15.

The fourth conductive plate 20 has a shape shown in FIG. 7 and is provided with the connector terminal 20a to protrude in the joint hole 16b1 at one end thereof. Another end of the fourth conductive plate 20 branches into two terminals, one of two terminals protrudes from the under face 16a2 of the base part 16a and is formed into a motor coupling terminal 20b to be connected electically with the coupler 10a of the motor terminal 10, and another terminal protrudes from the under face 16a2, is bent slightly and formed into a contact terminal 20c (invisible in FIG. 7) to be in contact with the gear casing 4 as shown in FIGS. 3 and 5. In addition, the fourth conductive plate 20 is also provided with a connective piece 20d branched from the side of the connector terminal 20a, the connective piece 20d is connected with the earth plate 15d of the autostop mechanism 15 so as to ground the contact plate 15b of the autostop mechanism 15 through the gear casing 4 in contact therewith.

The fifth conductive plate 21 is shaped as shown in FIG. 7 and provided with the connector terminal 21a to protrude in the joint hole 16b1 of the connector socket 16b at one end thereof. Another end of the fifth conductive plate 21 protrudes from the under face 16a2 of the base part 16a as shown in FIGS. 3 and 5 and is formed into a motor coupling terminal 21b to be connected electrically with the coupler 11a of the motor terminal 11.

Furthermore, the sixth conductive plate 22 has a shape shown in FIG. 7 and is provided with the connector terminal 22a to protrude in the joint 16b1 at one end thereof, another end of the sixth conductive plate 22 is so designed as to protrudes from the under face 16a2 of the base part 16a similarly to the motor coupling terminal 21b of the fifth conductive plate 21 and to be formed into another motor coupling terminal 22b to be connected with the coupler 12a of the motor terminal 12.

Accordingly, when the aperture 4b of the gear casing 4 is covered with the cover plate 16 provides with the conductive plates 17, 18, 19, 20, 21 and 22 having the aforementioned structure, the respective motor coupling terminals 20b, 21b and 22b of the conductive plates 20, 21 and 22 protruding from the under face 16a2 of the base part 16a are fitted into the couplers 10a, 11a and 12a of the motor terminals 10, 11 and 12 fixed to the holder base 5, the contact terminal 20c of the conductive plate 20 comes in contact with the gear casing 4 grounded, and the contactors 15e and 15f connected to the conductive plates 18 and 19 are pressed against the plate base 15c disposed with the contact plates 15a and 15b of the autostop mechanism 15, so that the internal circuit is completed as shown in FIG. 6.

The electric wiper motor 1 having the aforementioned structure is connected with an external circuit (not shown) by inserting the connector 35 into the joint hole 16b1 of the connector socket 16b of the cover plate 16 and connecting the terminal sockets 30, 31, 32, 33 and 34 of the connector 35 with the connector terminals 18a, 19a, 20a, 21a and 22a, respectively. Upon turning on a controller switch incorporated in the external circuit, an electric current supplied from the conductive plate 18 or 19 through the autostop mechanism 15 flows between the brush 7 and the brush 8 or 9 through the conductive plate 20 and the conductive palte 21 or 22, and flows in the armature 3 through the commutator 3b, thereby rotating the armature 3.

By the rotation of the armature 3, the rotation of the armature shaft 3a is transmitted to the output shaft 14 by reducing the rotational speed through the reduction gear 13, and the windshield of the automotive vehicle is wiped with a wiper blade (not shown) linked with the output shaft 14 according to the rotation of the output shaft 14.

Even if the controller switch is turned off, the electric current continues to be supplied to the armature 3 until the wiper blade arrives in the predetermined stop position according to the function of the autostop mechanism 15, and the electric current is shut off when the wiper blade arrives in the predetermined stop position. Namely, the electric wiper motor 1 is so designed as to stop the wiper blade at the predetermined position independently of the position of the wiper blade at the time of turning the switch off.

As described above, in the electric wiper motor according to this invention, it is possible to form the internal circuit for supplying an electric current to the armature through the autostop mechanism at the same time the aperture of the gear casing is covered with the cover member, which is disposed with the plural conductive plates in one body. Therefore, the troublesome wiring work becomes unnecessary and time is not required for fitting the grommet, and an excellent effect can be obtained since it is possible to reduce the time required for assembling and possible to improve the productivity very sharply.

What is claimed is:

1. An electric wiper motor comprising:
   (a) a motor casing with an opening, said motor having an armature including an armature shaft with a worm and a commutator disposed on the armature shaft, first and second brushes contacting the commutator and first and second motor terminals connected to the first and second brushes respectively, said armature shaft with the worm thereon extending through the opening in said motor casing;
   (b) a gear casing connected to said motor casing in communication with the opening of said motor casing and having a worm wheel therein meshing with the worm of the armature shaft of the armature in said motor casing and first and second fork-like couplers protruding from said motor casing into said gear casing with end portions of the first and the second fork-like couplers connected to the first and the second motor terminals in said motor casing respectively; and
   (c) a resinous cover plate covering an opening in said gear casing and having a connector socket integrally formed therewith, first, second, third and fourth conductive plates disposed in the connector socket and an automatic stopping device including a plate base disposed in said gear casing with first and second contact plates, the first contact plate being connected to the first conductive plate and the second contact plate being connected with the third and the fourth conductive plates at an automatic stop position of the automatic stopping device;

(d) wherein said first and second fork-like couplers of said gear casing receive said first and second conductive plates of said resinous cover plate respectively when said resinous cover plate is fitted onto said gear casing over the opening therein.

2. An electric wiper motor according to claim 1, wherein the first conductive plate of said resinous cover plate has a contact terminal contacting said gear casing.

3. An electric wiper motor according to claim 1, wherein the first conductive plate of said resinous cover plate is grounded.

4. An electric wiper motor comprising:
(a) a motor casing with an opening, said motor having an armature including an armature shaft with a worm and a commutator disposed on the armature shaft, first, second and third brushes contacting the commutator and first, second and third motor terminals connected to the first, second and third brushes respectively, said armature shaft with the worm therein extending through the opening in said motor casing;
(b) a gear casing connected to said motor casing in communication with the opening of said motor casing and having a worm wheel therein meshing with the worm of the armature shaft of the armature in said motor casing and first, second and third fork-like couplers protruding from said motor casing into said gear casing with end portions of the first, the second and the third fork-like couplers connected to the first, the second and third motor terminals in said motor casing respectively; and
(c) a resinous cover plate covering an opening in said gear casing and having a connector socket integrally formed therewith, first, second, third, fourth and fifth conductive plates disposed in the connector socket and an automatic stopping device including a plate base disposed in said gear casing with first and second contact plates, the first contact plate being connected to the first conductive plate and the second contact plate being connected with the third and the fourth conductive plates at an automatic stop position of the automatic stopping device;
(d) wherein said first, second and third fork-like couplers of said gear casing receive said first, second and fifth conductive plates of said resinous cover plate respectively when said resinous cover plate is fitted onto said gear casing over the opening therein.

5. An electric wiper motor according to claim 4, wherein the first conductive plate of said resinous cover plate has a contact terminal contacting said gear casing.

6. An electric wiper motor according to claim 4, wherein the first conductive plate of said resinous cover plate is grounded.

* * * * *